(12) United States Patent
Mulligan et al.

(10) Patent No.: US 6,454,873 B1
(45) Date of Patent: Sep. 24, 2002

(54) SYSTEM FOR PROCESSING FIBERGLASS

(75) Inventors: Daniel B. Mulligan, Bothell, WA (US); Russell H. Poy, Destranan, LA (US)

(73) Assignee: Regenex, L.L.P., Kenner, LA (US)

( * ) Notice: Subject to any disclaimer, the term of this patent is extended or adjusted under 35 U.S.C. 154(b) by 0 days.

(21) Appl. No.: 09/568,841

(22) Filed: May 11, 2000

Related U.S. Application Data

(60) Provisional application No. 60/133,597, filed on May 11, 1999.

(51) Int. Cl.[7] .............................. B08B 1/02; B08B 3/00; B08B 3/08; B08B 3/10
(52) U.S. Cl. ......................... 134/10; 134/19; 134/25.1; 134/25.5; 134/26; 134/28; 134/32; 134/61; 134/107; 134/109
(58) Field of Search ........................ 134/10, 25.1, 25.5, 134/26, 28, 32, 19, 109, 107, 61, 66

(56) References Cited

U.S. PATENT DOCUMENTS

| | | | |
|---|---|---|---|
| 3,966,600 A | * 6/1976 | Crowley et al. | 210/46 |
| 4,300,955 A | 11/1981 | Yount | |
| 5,225,045 A | 7/1993 | Watson | |

* cited by examiner

*Primary Examiner*—Zeinab El-Arini
(74) *Attorney, Agent, or Firm*—Browning Bushman

(57) ABSTRACT

Process and apparatus for recovering clean fiberglass and urea formaldehyde from urea formaldehyde treated waste fiberglass, which involves the use of a continuous batch tunnel machine comprising end to end modules in each of which a perforated basket is rotatable and of such construction as to transfer goods within each basket to subsequent baskets and out the end of the basket at the exit of the machine. The waste fiberglass is introduced into the basket at the entrance to the machine to pass the fiberglass out the end of the machine, during which it passes through acid and wash loops in which the recovery takes place.

11 Claims, 1 Drawing Sheet

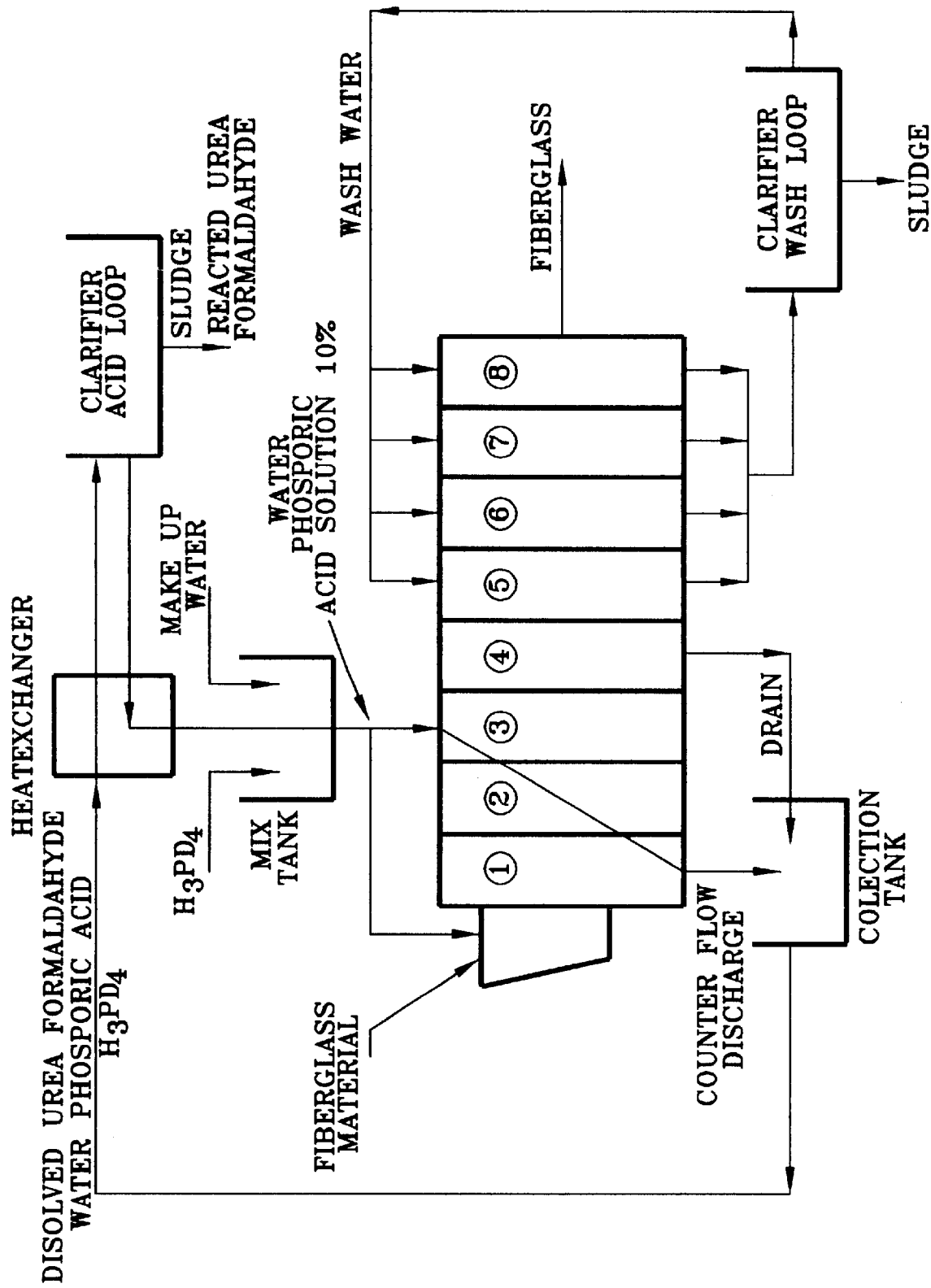

SYSTEM FOR PROCESSING FIBERGLASS

CROSS REFERENCE TO RELATED PROVISIONAL APPLICATION

This application is related to and claims the priority date of our Provisional Application, Serial No. 60/133,597, filed May 11, 1999.

FIELD OF THE INVENTION

This invention relates to process and apparatus for recovering clean fiberglass and resin from resin treated waste fiberglass. More particularly, it relates to improvements in such a process and apparatus in which the resin is urea formaldehyde.

BACKGROUND OF THE INVENTION

In his U.S. Pat. No. 4,300,955, Yount recognized the shortcomings of the then practice of disposing of waste fiberglass including the resin in landfills. Thus, as he points out, this results in the loss of valuable fiberglass as well as recovery of the resin, such as urea formaldehyde, for subsequent use. Thus, he proposed a process for separating the resin from the treated fiberglass by passing it though a treatment tank containing a mixture or solution of between ten percent and fifty percent phosphoric acid ($H_3PO_4$) to water ($H_2O$) which is heated to approximately 200 degrees Fahrenheit. The waste product is allowed to remain in the tank between five and thirty seconds or until the resin has been removed from the fiberglass fibers. The product is then removed from the treatment tank and washed with water.

The system is very cumbersome to operate and is not believed to be economically feasible from the standpoint of what is necessary to transfer material from one state of the process to the next, and it is the object of our invention to accomplish Yount's purposes with a process and apparatus which not only minimize the amount of effort and time required, but also promote separate of the waste fiberglass into the components for reuse, as above mentioned.

STATEMENT OF THE INVENTION

Thus, in accordance with our invention, the waste fiberglass is separated into clean fiberglass and resin, whereby both are recovered in substantially less time and with less effort. In a continuous batch tunnel machine of the type traditionally sed for washing goods, and more recently used in the recovery of fiber, as shown and described in U.S. Pat. No. 5,225,045. Thus, the machine comprises end to end modules in each of which a perforated basket is rotatable and of such construction as to transfer the goods within each basket to subsequent baskets and out the end of the basket at the exit of the machine. As the waste fiberglass is introduced into the basket at the entrance to the machine, and caused to move through the machine from basket to basket, it is agitated to promote separation of the resin from the waste fiberglass. More particularly, while so traversing the machine, the fiberglass is treated with acid and wash loops which circulate through the basket in a manner to quickly and efficiently separate waste fiberglass for recovering then clean fiberglass and resin suitable for further use.

Thus, an acid loop is established by introducing a solution of phosphoric acid and water into a module downstream of the entrance for counterflow through the fiberglass in the modules upstream thereof as the fiberglass is transferred from basket to basket in a downstream direction, collecting the solution from the modules through which it flows, cooling the collected solution and passing the cooled solution into a clarifier in which the sludge of resin is separated and collected for recovery therefrom, and heating the solution upon separation from the resin. Water and phosphoric acid are then added to the heated solution to return it to essentially its original concentration, and the solution, as reconstituted, is introduced into the downstream module for recirculation through the acid loop.

As the fiberglass continues to be transferred from module to module and out the exit of the machine, a water loop is established wherein the fiberglass so transferred is washed in water before discharge from the exit of the machine. The water is circulated through at least one of the modules and into a clarifier in which residual resin is separated for recovery from the water, and from which the clarified water is reintroduced into the module for recirculation back through it.

In the preferred and illustrated embodiment of the invention, the solution is comprised of water with approximately a ten percent concentration of phosphoric acid, and the resin in the waste fiberglass is urea formaldehyde.

As also illustrated, and in preferred embodiments of the invention, a solution in the acid loop is drained from a module downstream of the module into which it is introduced for return to the tank of the acid loop for collection.

As further illustrated, the solution from the clarifier is passed into the module at the entrance to the machine along with the waste fiberglass.

BRIEF DESCRIPTION OF THE DRAWING

The machine, components, loops and the circulation therethrough, are illustrated in the single FIGURE of drawings wherein the machine and components of the loops are labeled and the direction of the circulation illustrated with arrows.

DETAILED DESCRIPTION OF THE DRAWING

As shown in the drawing, the machine has light modules, numbered 1–8 from its at module 1 to its exit at module 8. Although not shown in detail, openings in the ends of each module are connected to openings in the adjacent module. Also, each module has a perforated basket rotatable therein and having aligned openings in its ends aligned with the module openings so that the fiberglass may be transferred from one basket to the next and out the exit basket, by suitable controls disclosed in the aforementioned patent. As will be described to follow, the acid loop is linked to modules 1–4, and the wash loop to modules 5–8.

The waste fiberglass is introduced into the basket of Module 1 to begin its processing in a solution of water and phosphoric acid of the acid loop that are combined to a ten percent by weight phosphoric acid and at a temperature of 200 degrees Fahrenheit. The transfer rates from one module which rotates together to the next are at 49 second intervals. As the waste fiberglass enters into Module 1, its binding agent, which is the urea formaldehyde, dissolves in the phosphoric acid solution. That reaction continues through Modules 1, 2 and 3. In Module 4, the residual liquid process solution is drained. The fiberglass is then transferred from Module 4 into modules 5, 6, 7 and 8 where it is washed and residual phosphoric acid solution is washed away so that the resulting material exiting Module 8 is clean fiberglass.

Modules 5, 6, 7 and 8 drain and the collected wash water is pumped to a clarifier for the wash water loop. In the clarifier, the residual reacted urea formaldehyde and phosphoric acid solution is processed with the urea formaldehyde being floated off. The clarified water is then returned to Modules 5, 6, 7 and 8 to complete the closed loop wash application. The sludge from the clarifier is collected and then processed for reuse.

In the acid loop, the above mentioned solution of water and phosphoric acid is injected into Module 3 and counterflowed from Module 3 to Module 2 and then to Module 1, and then is discharged from Module 1. That effluent is collected in a collection tank. Additionally, the phosphoric acid solution is also injected in the feed chute to Module 1 at a rate of about fifty gallons per transfer. This is to make up for solution losses from Module 4 to Module 5.

As material transfers from Modules 1, 2 and 3, the urea formaldehyde binder is dissolved, and there is solution carryover into Module 4, which is run dry. As the water along with the clean fiberglass is transferred from Module 3 to Module 4, most of the solution is drained out of Module 4 and returned to the collection tank. This is to minimize the amount of chemical loss in the system.

From the collection tank, the process solution is pumped through a heat exchanger and then into the clarifier. The objective is to cool the solution and to collect the reacted urea formaldehyde as a sludge from the clarifier.

The clarified water is then returned to the system. Prior to reaching the system, it is pumped through the heat exchanger reheating the water as it flows to a mix tank where makeup water and makeup phosphoric acid are added to the solution to reconstitute a ten percent by weight solution that can be fed to the system.

The purpose of the two loops are twofold. In the acid loop, there is a higher concentration of phosphoric acid, and therefore to minimize the amount of phosphoric acid that is necessary to complete the reaction, it is separated from a more dilute concentration in the wash water loop. There is more fresh water in the wash loop which includes Modules 5, 6, 7 and 8, and because the phosphoric acid solution is so dilute and there is minimal sludge that is expected to carryover here, it is felt that this better suits a process strategy having a wash water loop. In the acid loop, the solution has the opportunity to recover heat as well as minimize the amount of chemical loss and maximizes the reuse of the phosphoric acid solution.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A process for recovering clean fiberglass and resin from resin treated waste fiberglass which involves the use of a continuous batch tunnel machine having an entrance and exit comprising end to end modules in each of which a perforated basket is rotatable and of a construction to transfer goods within each basket to subsequent baskets and out the end of the basket at the exit of the machine, including the steps of introducing the waste fiberglass into the basket at the entrance to the machine, and, as the fiberglass is moved through subsequent basket and out the exit of the machine;

establishing an acid loop having a tank by
      introducing a solution of phosphoric acid and water into a module downstream of the entrance for counterflow through the fiberglass in the modules upstream thereof as it is transferred from basket to basket in a downstream direction;
      collecting the solution from the modules through which it flows;
      cooling the collected solution and passing the cooled solution into a clarifier in which a sludge of resin is separated and collected for recovery therefrom;
      heating the solution upon separation from the resin; adding make up water and phosphoric acid to the heated solution to return it to essentially its original concentration;
      introducing the solution as reconstituted, into the downstream module for re-circulation through the acid loop, and;
      as the fiberglass continues to be transferred from module to module and out the exit of the machine;
   establishing a water loop
      wherein the fiberglass so transferred is washed in water before discharged from the exit of the machine.

2. The process as in claim 1, wherein
   the water is circulated through at least one of the modules, and into a clarifyier in which residual resin is separated for recovery from the water, and from which the clarified water is reintroduced into the module for recirculation back through it.

3. The process as in claims 1 or 2, wherein
   the solution is comprised of water with approximately a ten percent concentration of phosphoric acid, and
   the resin in the waste fiberglass is urea formaldehyde.

4. The process as in claim 1, wherein
   solution in the acid loop is drained from a module downstream of the module into which it is introduced for return to the tank of the acid loop for collection.

5. The process as in claim 1, wherein
   the solution from the clarifier is passed into the module at the entrance to the machine along with the waste fiberglass.

6. Apparatus for recovering clean fiberglass and resin from resin treated waste fiberglass, comprising
   a continuous batch tunnel machine having an entrance and exit end to end modules in each of which a perforated basket is rotatable and of a construction to transfer goods within each basket to subsequent baskets and out the end of the basket at the exit of the machine;
   whereby the waste fiberglass is introduced into the basket at the entrance to the machine for movement through subsequent baskets and out the exit of the machine;
   an acid loop having
      means for introducing a solution of phosphoric acid and water into a module downstream of the entrance for counterflow through the fiberglass in the modules upstream thereof as it is transferred from basket to basket in a downstream direction;
      means in which the solution is collected from the modules through which it flows;
      a means for cooling the collected solution;
      a clarifier into which the cooled solution is passed to cause a sludge of resin to be separated and collected for recovery therefrom;
      means for heating the solution upon separation from the resin;

means for adding make up water and phosphoric acid to the heated solution to return it to essentially its original concentration;

means for introducing the solution as reconstituted into the downstream module for re-circulation through the acid loop; and a water loop having means for washing the fiberglass in water as it continues to be transferred from module to module and out the exit of the machine before discharge from the exit of the machine.

7. The apparatus as in claim 6, further including means for circulating the water through at lease one of the modules, and passing the circulated water into a clarifier in which residual resin is separated from the water, and means for recirculating the clarified water back through the water loop.

8. The apparatus in claims 6 or 7, wherein the solution is comprised of water with approximately ten percent concentration of phosphoric acid, and the resin in the waste fiberglass is urea formaldehyde.

9. The apparatus as in claim 8, further including means for draining solution from a module downstream of the module into which it is introduced for return to a collection in the acid loop.

10. The apparatus as in claim 6, wherein the acid loop further includes means for introducing the solution into the module at the entrance along with the waste fiberglass.

11. The apparatus as in claim 6, further including means for passing the solution into and through a heat exchanger to cool it before collection in the clarifier and then passing the solution through the heat exchanger following separation of the resin in the clarifier and before make up.

* * * * *